United States Patent

[11] 3,609,458

[72] Inventor Thomas C. Penn
Richardson, Tex.
[21] Appl. No. 37,562
[22] Filed May 15, 1970
[45] Patented Sept. 28, 1971
[73] Assignee Texas Instruments Incorporated
Dallas, Tex.

[54] ELECTRONIC SAFETY SYSTEM
14 Claims, 6 Drawing Figs.
[52] U.S. Cl. .................................................... 317/18 D,
317/27 R, 317/33 SC, 317/148.5 B, 323/89 C
[51] Int. Cl. .................................................... H02h 3/28
[50] Field of Search ........................................... 317/18 D,
27 R, 33 SC, 148.5 B; 323/75 S, 89 B, 89 C

[56] References Cited
UNITED STATES PATENTS
2,700,125  1/1955  King et al. ........................ 317/18 D
3,296,493  1/1967  Whittaker et al. ............... 317/18 D
3,407,337  10/1968  Benham ......................... 317/18 D Primary Examiner—James D. Trammell
Attorneys—Harold Levine, Edward J. Connors, Jr., John A. Haug, James P. McAndrews and Gerald B. Epstein ABSTRACT: An electronic safety system is disclosed for detecting leakage of electrical signals from a load circuit to ground in order to selectively disrupt the supply of power to the load circuit. A pair of electrical conductors couple the load circuit to the source of power. Adjacent sections of the electrical conductors intermediate the load circuit and the power supply are inductively coupled to a selectively energizable saturable core magnetic means, which is connected to an energizing circuit adapted to establish a magnetic field within the saturable core magnetic means. Means are coupled to the saturable core magnetic means for sensing affects on the magnetic field resulting from the presence of unequal currents in the adjacent sections of the conductors, the unequal currents being due to the leakage of current from one of the conductors to ground. Such affects generate an electrical output signal, which may be utilized for effecting operation of a circuit breaker to disrupt the power being supplied to the load.

Inventor,
Thomas C. Penn,
by Gerald B. Epstein
Att'y.

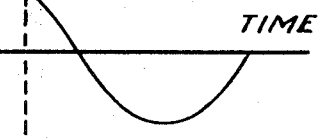
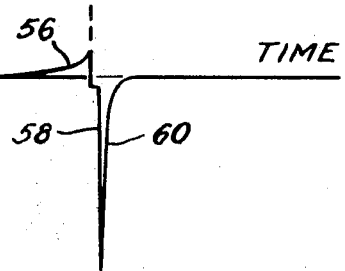
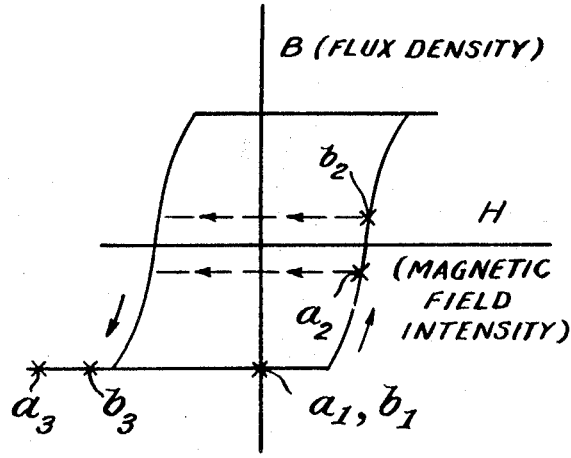
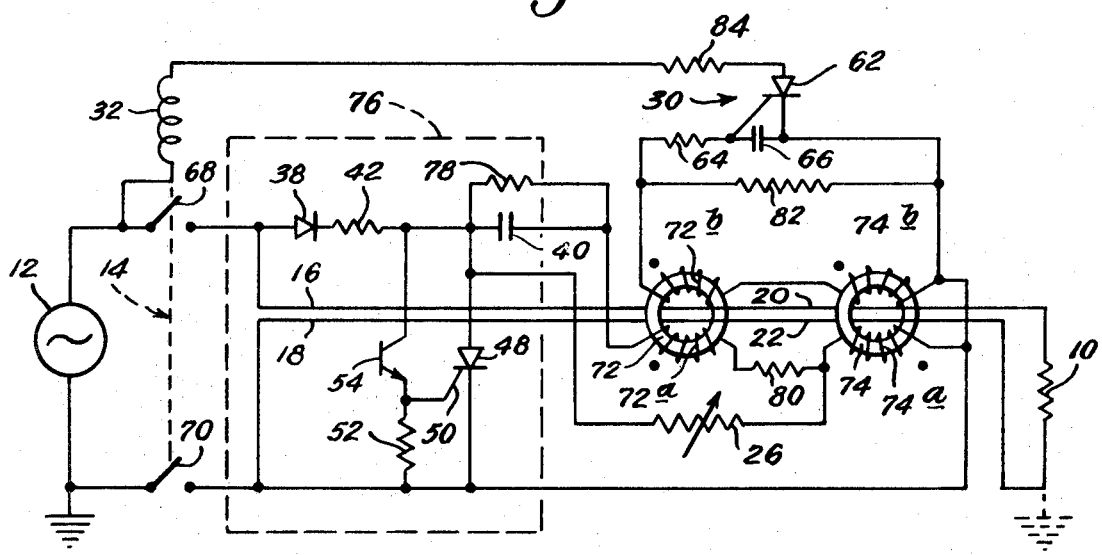

ELECTRONIC SAFETY SYSTEM

The present invention relates generally to safety systems and more particularly is directed to an improved electronic safety system for detecting the presence of ground leakage signals from a load circuit.

As the usage of various types of electrical equipment in the home and industry has dramatically risen in recent years an increasing awareness has simultaneously arisen in regard to the previously unquestioned safety aspects associated with the usage of such equipment. For example, in the health care field in hospitals, nursing homes, etc., continually more sophisticated electronic equipment has become available for monitoring various bodily functions of a patient in order to provide expanded diagnostic information, as well as to free personnel for other duties. In such instances, the electrical equipment may be in electrical contact with the patient under surveillance for prolonged periods of time often without the presence of an operator or attendant. In addition, the patient may be in an extremely weakened condition due to advanced age, illness, etc. and is frequently unconscious while in contact with the electronic equipment. These circumstances have created an intense concern for the safety of individuals exposed to contact with such equipment. Furthermore, in recent years increased emphasis has been placed upon an extended lifetime for such equipment. As a result of utilization for a prolonged period of time there is an increased likelihood of minor electrical faults developing in the equipment, which faults do not significantly affect operation and often remain undetected due to the extremely high degree of complexity and the lack of skilled personnel for continually maintaining the equipment. Thus, various faults may be present in electronic equipment which result in the leakage of electrical current to ground. Moreover, even when equipment is not subject to electrical faults a certain amount of electrical leakage current to ground may nevertheless be present due to improper electrical design, improper usage, deterioration caused by environmental factors, etc.

Although various types of electrical safety systems are utilized throughout the world such equipment is often totally unsatisfactory for providing the requisite degree of protection. Typically, the safety equipment utilized in the average home electrical distribution circuits comprise several 15 or 20 ampere rated circuit breakers or fuses. Thus, when electronic equipment being supplied by the circuit is subjected to a disastrous fault, such as a short circuit or the like, leading to a current in excess of the rated level, the circuit breaker is operated or the fuse is destroyed to disrupt the supply of power to the equipment. However, such a system is totally inadequate for providing protection in the event of a minor electrical fault leading to a leakage current of perhaps several hundred milliamps to ground. Such a current frequently can be disastrous to a human being in contact with the ground path circuit. A typical example of such an instance may arise when a faulty piece of kitchen equipment or bathroom equipment is utilized, having a leakage current of several hundred milliamps, when the user is in contact with the equipment and standing n a moist floor thereby becoming subject to a possibly fatal electrical shock due to the ground current flow. Of course, such a small current level although potentially dangerous to a human being, would go undetected by conventional circuit breaker protective devices which are typically activated by a current in excess of 15 or 20 amperes. Similarly, in he health care field a weakened cardiac patient, for example, may be connected to an electronic surveillance device such as electrocardiograph equipment or the like. This type of equipment is normally totally safe, but could be subject to small leakage currents under certain circumstances due to an electrical fault, improper grounding, etc., such a leakage current being of the order to 1 to 5 milliamps and being extremely difficult to detect. The equipment may bee utilized for a period of time with no problem arising. However, in the event the patient were to contact a metallic bed frame, for example, with a part of his body, while in contact with the defective equipment, the patient could receive the leakage current through his body. Such a current level would remain undetected by the usual type of safety equipment and could be harmful to the weakened patient resulting in an adverse, possibly fatal, affect upon heart action. A resultant examination of the deceased patient would very rarely reveal that the cause of death was defective equipment because it would be assumed that the disease of the heart, which was under treatment had resulted in the heart stoppage since the affects of the minute electrical current would be similar to the actions of certain cardiac diseases. It may be readily appreciated that the above example could be repeated numerous times without detection. Accordingly, it may be seen that some measure of protection against the affects of defective electrical equipment is extremely important.

Presently available devices for achieving such protection are relatively uncommon, extremely expensive, and subject to significant unreliability in use, as well as frequent nuisance tripping. Furthermore, such devices often lack the requisite degree of sensitivity and may be relatively complex to install. For example, certain typical prior art devices of this type often utilized bulky differential transformer devices in conjunction with amplifiers in order to detect the presence of ground leakage current. Such devices have been inadequate in use particularly in view of the frequent problems in the high signal to noise ratio which frequently led to undesired tripping of the distribution system circuit breaker. In addition, since such equipment was often unsatisfactory in use, it was frequently disconnected after purchase and installation due to the inconvenience caused by its unsatisfactory operation, even in instances where there was a need for equipment of this type to provide a measure of protection.

Accordingly, it is an object of the present invention to provide an improved electronic safety system.

It is another object of the present invention to provide an improved electronic safety system for detecting the presence of ground leakage currents from a load circuit.

It is still another object of the present invention to provide an improved electronic safety system adapted to be coupled to a conventional circuit breaker system for selectively disrupting the supply of power to a load in response to the presence of potentially harmful ground leakage currents from a load circuit.

It is a further object of the present invention to provide an improved electronic safety system for selectively disrupting the supply of power to a load in response to a fault in an electrical load circuit which causes the presence of ground leakage currents, which system is economical to fabricate, compact in appearance, inexpensive to operate, and durable in use.

Various additional objects and features of the present invention will be readily apparent from the following detailed description and accompanying drawings wherein:

FIG. 3 is a graph illustrating the sinusoidal AC line voltage being supplied to the load circuit;

FIG. 4 is a current-time graph illustrating a typical electrical energizing signal utilized in conjunction with the system of present invention;

FIG. 5 is a graph of flux density versus magnetic field intensity illustrative of the operation of a portion of the system of the present invention; and FIG. 6 is a schematic circuit diagram of an alternate embodiment of the system illustrated in FIG. 2.

Figure 1:
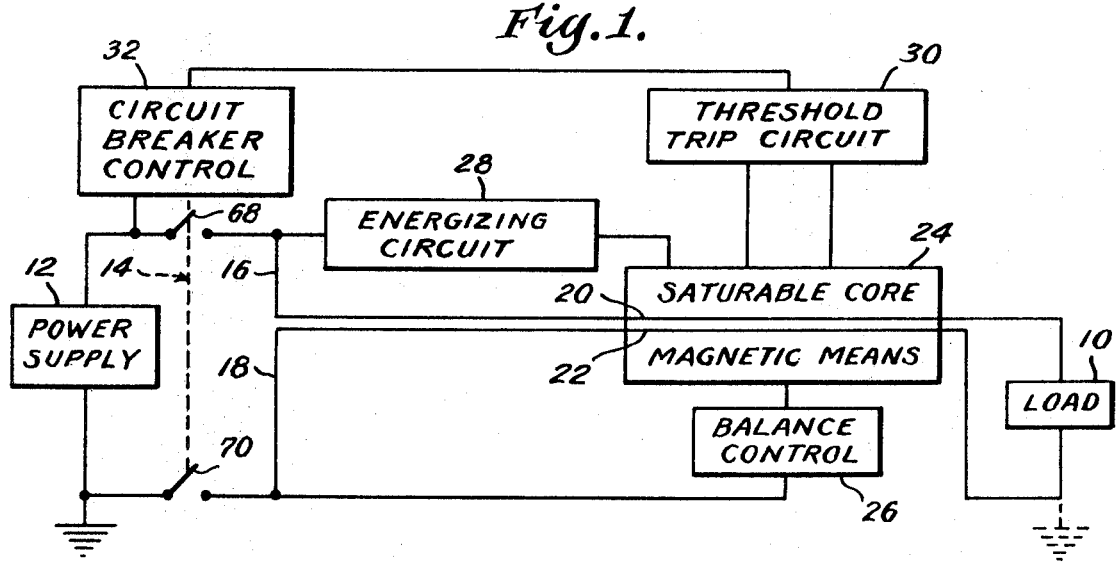
FIG. 1 is a block diagram of a safety system in accordance with the present invention.

Referring generally to the drawings, and particularly to FIG. 1, a load circuit 10 is illustrated coupled to a power supply 12 through a circuit breaker means 14 by first and second conductors 16 and 18 respectively. The conductors 16 and 18 include adjacent sections 20 and 22 respectively, which are intermediate the circuit breaker 14 and the load 10. The adjacent sections 20, 22 are inductively coupled to a saturable core magnetic means 24, which senses the establishment of magnetic fields produced by the adjacent sections of the conductors due to the presence of unequal flowing through the adjacent sections 20, 22 of conductors 16, 18. Such unequal currents result when there is a leakage of current to ground from the load circuit 10, which is coupled to the conductors 16, 18. A balance control means 26 is also coupled to the saturable core magnetic means 24 in order to effect initial calibration thereof. An energizing circuit 28 is provided for selectively energizing the saturable core magnetic means 24 during preselected time intervals so as to effect the establishment of a voltage output signal across the output of the saturable core magnetic means in response to the passage of unequal currents through the adjacent sections 20, 22 of the conductors. In addition, a threshold sensing circuit 30 is coupled to the output of the saturable core magnetic means 24 for detecting the presence of the output signal in order to provide an electrical signal which is coupled to a circuit breaker control 32 connected to the circuit breaker 14 for selectively disrupting the supply of power to the load.

Figure 2:
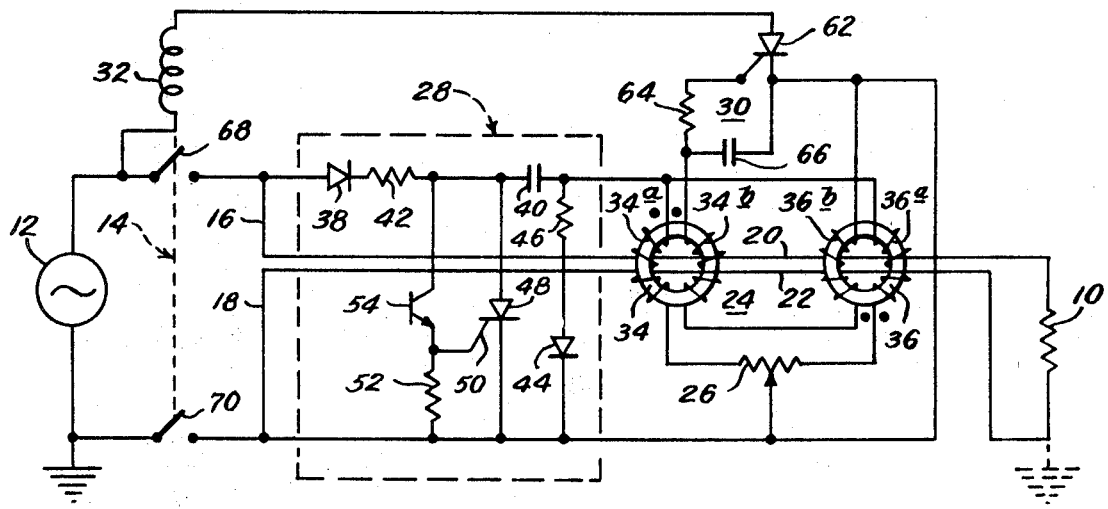
FIG. 2 is an electrical schematic circuit diagram of the system illustrated in FIG. 1.

More particularly, referring to FIG. 2 which illustrates an electrical schematic circuit diagram of a preferred embodiment of the present invention, corresponding to the system illustrated in FIG. 1, it may be seen that the load 10 is represented as a resistance load, although a capacitive or inductive load may also be present, coupled to the power supply 12 by the conductors 16 and 18 through the circuit breaker means 14. As illustrated in detail, the conductor 16 is connected between one side of the power supply 12 and one side of the resistance load 10, while the conductor 18 is coupled to the opposite side of the power supply and to the opposite side of the load and is also shown coupled to ground to denote the existence of a possible path for leakage currents to ground. Such a configuration may be generally representative of a conventional home electrical distribution system, for example, in which a power supply is coupled to a load through a circuit breaker by a pair of conductors. In such a system, the passage of leakage current may occur in the presence of an electrical fault in the load circuit, absent the provision of a safety system, in accordance with the principles of the present invention.

As shown in detail in FIG. 2, the conductors 16 and 18 include the adjacent sections 20, 22 which pass through and are inductively coupled to the saturable core magnetic means 24, which in the illustrated embodiment comprises first and second saturable core toroids 34 and 36 respectively. The conductors 16 and 18 are not electrically coupled to the saturable core toroids 34, 36, but are electrically coupled to the load resistor 10 as shown. As a result, the saturable core toroids may be selectively energized, as will be explained in detail, independently of the load circuit 10, in order to sense the presence of unequal currents passing through the adjacent sections 20 and 22 of the conductors to the load resistor 10, such unequal currents being the result of potentially harmful ground leakage currents from the load circuit. In the presence of unequal currents, the magnetic balance of the saturable core toroids is upset and an output signal is provided which is effective to cause operation of the circuit breaker means 14 in order to disrupt the supply of power to the load.

More particularly, the first and second saturable core magnetic means preferably comprise a pair of toroid cores including primary windings 34a and 36a and secondary windings 34b and 36b respectively wound on the toroid cores, while the adjacent sections 20, 22 of the conductors pass generally centrally through each of the respective toroid cores. These adjacent sections 20, 22 functions as an additional set of primary windings for the toroids 34, 36 in that the sections 20, 22 are adapted to affect the magnetization of the toroid cores, when unequal electrical currents pass through the sections, which are inductively coupled to the toroid cores. If desired, the secondary windings may have more turns than the primary windings in order to increase the voltage sensitivity of the system. In the illustrated embodiment, the primary windings 34a and 36a of the first and second saturable core reactors are electrically connected in parallel relationship with each other and are magnetically coupled in series opposition such that opposite and generally equal magnetic fields may be established in the toroid cores in response to energization by the primary windings. Thus, in the absence of external effects energization of the saturable core reactors does not produce an output signal across the respective output windings 36a, 36b since the magnetic fields established in each of the toroid cores are of opposite polarity and approximately equal in magnitude. In order to provide initial calibration, the balance control 26, which comprises a variable resistor is connected intermediate primary windings 34a and 36a of the first and second saturable core reactors. Consequently, in the absence of an electrical fault of the like, causing a current unbalance in sections 20, 22 which would affect the magnetization of the toroid cores, the cores 34 and 36 may be energized by the energizing circuit and driven in a selected magnetic direction and selectively switched and driven in an opposite magnetic direction with no resultant output signal being developed across the secondary windings 34b and 36b, since the time-varying magnetic fields established are of generally equal magnitude and opposite polarity.

However, the flow of unequal currents through the conductors 16, 18 as a result of ground current leakage generates a relatively weak magnetic field, which may be detected by its affect upon the relatively intense magnetization of the toroid cores which is established during rapid switching of the magnetic states of energization of the toroids, thereby providing an indication of the presence of ground leakage currents. In addition, a substantial amplification of the affect of the aforementioned weak magnetic field results so as to achieve a relatively high degree of sensitivity in detecting the presence of relatively minute ground leakage currents. Rapid and intense switching of the magnetic state of the toroids is effected by the energizing circuit 28, which is provided for initially magnetically biasing each of the toroid cores in one predetermined direction and then rapidly switching the direction of magnetic energization of the toroid cores by applying a sharp pulse signal in order to achieve rapid switching of the state of magnetization of the toroid cores in a second opposite predetermined direction. In the absence of a magnetic field applied to the toroid cores by the presence of unequal currents in the adjacent sections 20, 22 of the conductors 16 and 18 each of the toroid cores is driven into a state of magnetic saturation by the sharp pulse signal in the same time interval. However, in the presence of a magnetic field due to a difference in the currents in the sections 20, 22 each of the toroid cores is switched into magnetic saturation in a different time interval and an output signal is established across the secondary windings 34b and 36b due to the affect of the weak magnetic field on the magnetic switching of the toroid cores.

The operation of the energizing circuit 28 and its affect on the toroid cores 34, 36 will now be explained in detail in conjunction with FIGS. 3–5 which illustrate the electrical signals being applied and the resultant pulse output signals supplied by the energizing circuit 28, as well as a typical magnetization curve showing the magnetization of the toroid cores.

The energizing circuit 28 is preferably coupled to the power supply 12 through the circuit breaker 14, as shown. The energizing circuit includes a diode 38 which supplies half-wave rectified power to one terminal of a charging capacitor 40 through a resistor 42, which functions primarily for establishing a desired magnetization level of the cores 34, 36. Although half-wave rectified power is utilized in the illustrated embodiment if desired, a full-wave bridge rectifier may be employed in place off the diode 38 in order to provide full-wave rectified power to the charging capacitor 40. The opposite terminal of the charging capacitor 40 is coupled to the saturable core magnetic means 24 as shown. In this connection the capacitor 40 is connected to the parallel connected primary windings 34a and 36a of each of the saturable toroid cores 34 and 36 respectively in order to supply energizing signals thereto. In addition, the opposite terminal of the capacitor is connected to a serially connected diode 44 and resistor 46 to assure that an adequate preselected voltage level is established across the capacitor 40 for effecting the desired magnetization of the toroid cores. Discharge of the capacitor which applies a high energy electrical pulse to the primary windings 34a, 36a in order to magnetize the toroid cores is controller by a first selectively triggerable switch means 48 having a control electrode 50. The switch means 48 is connected across the capacitor, as shown, to effect the discharge thereof, when the preselected voltage level has been established across the capacitor. The switch means 48 preferably comprises a silicon controlled rectifier with its gate electrode 50 coupled to a gate resistor 52, which is provided in order to obtain improved temperature stability. The gate electrode 50 is also coupled to a voltage threshold reference device 54, which prevents triggering of the silicon controlled rectifier 48 until the preselected voltage level has been established across the capacitor 40. In this regard, the voltage threshold reference device 54 preferably comprises a baseless transistor, commonly referred to as a diac, connected between the capacitor 40 and the gate electrode 50 of the silicon controlled rectifier, as shown. The diac 54 remains nonconductive until its threshold voltage level is exceeded, which in the illustrated embodiment is effected in response to the establishment of the preselected voltage level across capacitor 40, whereupon the diac is triggered and supplies a constant voltage level signal to the gate 50 to render the silicon controlled rectifier 48 conductive.

During operation of the energizing circuit 28, the line voltage signal is initially supplied to the diode 38 through the closed circuit breakers 14, the line voltage being illustrated in FIG. 3 as a typical 110/115 volt, 60 Hz. sinusoidal voltage signal. If desired, of course, a suitable DC power source also may be utilized. As a result of the particular configuration of the energizing circuit, illustrated in FIG. 2, the output current from the capacitor 40 initially approximately follows a curve as shown by the portion 56 of the curve illustrated in FIG. 4, depicting the time-varying current signal at the output of the capacitor 40, this signal being applied to the parallel-connected primary windings 34a and 36a as charge is stored in the capacitor. During this time interval, the storage of adequate charge on the capacitor 40 to assure that the desired magnetization of the cores may be established is effected due to the provision of the diode 44 and resistor 46, and also by the nonconduction of the silicon controlled rectifier 48, which is initially maintained nonconductive by the diac 54. Accordingly, an initial bias energizing signal is supplied to the primary windings 34a and 36a in accordance with the portion of the curve 56, illustrated in FIG. 4. Correspondingly, the application of this signal to the primary windings 34a and 36a results in a sufficient current flow through the primary windings to cause their associated toroid cores to be bias magnetized in a first predetermined direction, while the requisite voltage level is being established across the capacitor 40. More particularly, referring to FIG. 5 which illustrates the magnetization curve of a typical saturable ferrite core toroid, such as the saturable core toroids 34, 36, it may be seen that both of the cores are initially at a remanent state represented by the point $a_1, b_1$, on the magnetization curve.

However, as the signal represented by the portion 56 is applied to the parallel connected cores, the magnetization of the cores follows the magnetization curve to a point $a_2$ in regard to the core 34 and $b_2$ in regard to the core 36, as a typical example. For the sake of illustration, the points $a_2$ and $b_2$ are indicated at different points on the magnetization curve in order to represent the difference in magnetization of each of the respective cores 34 and 366 due to the passage of unequal currents in the adjacent sections 20 and 22 of the conductors 16 and 18 due to the presence of ground leakage current. In this connection, in those instances in which no ground leakage current is present and equal currents are flowing in conductors 16 and 18, the points $a_2$ and $b_2$ are at identical locations on the magnetization curve, although for illustrative purposes, it is assumed that leakage current is present which affects the bias magnetization of the toroid cores so that the points $a_2$ and $b_2$ are not concomitant, but are located on different regions of the magnetization curve. As the voltage established across the capacitor 40 approaches the requisite preselected level, the voltage applied to the diac 54 reaches the diac threshold voltage level, causing the diac to be triggered, resulting in the application of a signal to the gate electrode 50 is silicon controlled rectifier 48 sufficient to render the silicon controlled rectifier conductive. As a result, a discharge path is provided for the capacitor 40 through the anode-cathode circuit of the silicon controlled rectifier resulting in the establishment of an abrupt, high amplitude current pulse of an opposite polarity from the initial bias signal, such as that shown by the portion 58 of the curve illustrated in FIG. 4. This pulse is applied to the respective parallel-connected input windings 34a and 36a. As a result of the application of this high energy pulse the toroid cores 34 and 36 are driven rapidly into magnetic saturation in a second predetermined direction opposite to the initial bias direction, the magnetization of each of the cores at a common time interval being designated by the points $a_3, b_3$ on the magnetization curve (FIG. 5). In the illustrative example, since each of the cores is driven into saturation from a different point on the magnetization curve, a different time interval is required for each of the cores to reach saturation. Similarly, it may be noted that in those circumstances, when the cores are driven into saturation in this manner from concomitant bias points, the time intervals required for each core to be given into saturation are, of course, essentially identical. However, in the illustrative example in which it is assumed that unequal currents are flowing in the sections 20, 22 so that the cores have been initially differentially biased due to the affect of the weak magnetic field produced by the unbalanced current flow prior to being driven into saturation by the pulse 58, a different predetermined time interval is required for each of the cores to be driven into saturation. Accordingly, a different magnetic flux level is switched through each of the respective toroid cores in view of the differing initial bias levels and the differing time intervals required for reaching magnetic saturation. Consequently, a voltage signal is generated across the output windings 34b and 36b of the respective toroid cores. As the capacitor output current returns toward the zero level, as shown by the portion 60 of the curve of FIG. 4, the magnetization of each of the toroid cores again returns to the initial remanant state of magnetization $a_1, b_1$, of FIG. 5. Thus, it may be seen that the energizing circuit 28 effects rapid switching of the magnetic states of each of the toroid cores 34 and 36 in order to provide an extremely sensitive means for sensing an inequality in the currents flowing through adjacent sections 20, 22 of the conductors 16 and 18 (due to ground leakage), as indicated by the affect of the magnetic field produced by such current inequality on the magnetic switching. It should also be noted that, although the preceding description has been based upon a mode of operation in which the cores are initially biased in one direction and then abruptly driven into saturation in an opposite direction, if desired, the cores may be rapidly driven into magnetic saturation in the same direction as the initial bias state, while achieving a similar desired result in sensing the affect on the switching caused by leakage currents.

In order to sense or detect the presence of an output signal across the secondary windings 34b, 36b, of the toroid cores 34, 36, the sensing circuit 30 is provided connected across the output of the secondary windings 34b and 36b as shown. In this connection, the voltage sensing network 30 includes a second selectively energizable switch means 62 which is connected across the output of the secondary windings 34b and 36b and responds to the presence of a voltage output signal across these windings. The switch means 62 is arranged such that it is normally nonconductive in the absence of a sensed output signal appearing across the secondary windings 34b and 36b. Accordingly, in the absence of an unequal current flow through the adjacent sections 20, 22 the switch means 62 remains nonconductive, while it is rendered conductive in response to a preselected voltage output signal across the secondary windings. The second switch means 62 preferably comprises a silicon controlled rectifier having its gate-cathode circuit connected across the output of the secondary windings 34b, 36b, as shown. In addition, the gate of the silicon controlled rectifier 62 is coupled to a series-connected resistor 64 and capacitor 66, which function as a filter network, in order to prevent undesired nuisance tripping of the network 30. In the presence of a ground leakage current which produces an inequality in the current flow through the adjacent sections 20 and 22, establishing a preselected voltage level across the output of the secondary windings, a sufficient signal is established across the resistor 64 coupled to the gate of the silicon controlled rectifier 62 to trigger the silicon controlled rectifier. As a result of triggering or firing of the silicon controlled rectifier 62, a signal is provided which may be utilized for indicating the presence of a ground leakage current and/or providing protection against the affects of such a leakage current, such as by effecting operation of the circuit breaker 14.

More particularly, in the illustrated embodiment, the circuit breaker control 32, which controls operation of the circuit breaker 14, preferably comprises a selectively energizable relay coil which is coupled between the power supply 12 and the anode-cathode circuit of the silicon controlled rectifier 62 such that conduction or energization of the silicon controlled rectifier 62 energizes the relay coil 32. In addition, the circuit breaker 14 is illustrated as comprising a pair of relay contacts 68 and 70 operatively connected to the relay coil 32 and adapted to e opened in response to energization of the relay coil 32 upon energization of the silicon controlled rectifier 62. Thus, as a result of the establishment of an output signal across the secondary windings 34b and 36b the silicon controlled rectifier 62 is rendered conductive, energizing the relay coil 32, effecting opening of the contacts 68 ad 70, and thereby disrupting the supply of power to the load so as to afford the requisite safety protection.

By suitably selecting component values of the system, it is possible to achieve an operative sensitivity for the system in a desired range. For example, it is generally advantageous to assure tripping of the circuit breaker in response to a leakage current to ground of the order to 5 milliamps or greater, since such a current level could be sufficient in certain instances to be potentially harmful. If desired, the circuit trip point may be selectively adjusted by varying the setting of the balance control 26, while sensitivity of the system is dependent in part upon the properties of the toroid cores selected. In this connection, it is generally desirable to utilize toroid cores which have a nearly rectangular hysteresis curve in order to achieve a relatively high degree of sensitivity. Various types of ferrite-core or metallic tape wound core toroids have been used successfully in this regard. In addition, it has been found desirable in certain instances to utilize toroid cores having multiple turn windings with a unity turns ratio of primary to secondary windings and with both the first and second toroid cores 34, 36 having the same number of turns. Furthermore, in certain instances, it has been found to be desirable to effect prevention of nuisance tripping of the circuit breakers due to the presence of spurious signals resulting from the passage of relatively large current signals through the conductors 16, 18, by winding or twisting the conductors upon themselves, this twisted configuration effecting the substantial self-cancellation of the magnetic fields produced by such spurious signals.

Although in the system illustrated in FIG. 2, the respective windings of each of the toroids are shown as electrically connected with each other in parallel relationship, in certain instances, it may be advantageous to provide a similar system in which the respective windings are electrically connected in series relationship. An alternate embodiment of the present invention, illustrating such a configuration, is shown in FIG. 6. Such a system is particularly advantageous in situations where core material is available having a relatively square hysteresis curve in order to achieve efficient operation.

Referring now in detail to the embodiment illustrated in FIG. 6 wherein corresponding parts have corresponding reference numerals in comparison with FIG. 2, it may be seen that the load 10 is coupled to the power supply 12 through the circuit breaker means 14. In addition, the first and second conductors 16 and 18 are coupled between the power supply and the load, while the adjacent sections 20 and 22 intermediate the power supply and the load pass generally centrally through the first and second saturable core toroids 72 and 74 respectively, and are inductively coupled thereto. Each of the toroid cores 72 and 74 includes a primary winding 72a and 74a, and a secondary winding 72b and 74b respectively.

The primary windings 72a and 74a are electrically connected in series relationship, the secondary windings 72b and 74 b are similarly electrically connected in series relationship, as shown. In addition, an energizing circuit 76 is connected between the power supply 12 and the saturable core reactors 72 and 74 to supply energization thereto similarly to the energizing circuit 28, but the energizing circuit 76 is somewhat modified in comparison with the energizing circuit 28 in view of the series connection of the toroid cores. However, operation of the energizing circuit 76 is quite similar to the operation of the energizing circuit 28, and similarly, is arranged to provide an output pulse signal, such as that illustrated in FIG. 4. The energizing circuit 76 also includes the half-wave rectifier diode 38 coupled to the charging capacitor 40 through the resistor 42, which aids in establishing the requisite level of magnetization for the cores 72, 74. The energizing circuit 76 also includes the silicon controlled rectifier 48 having its gate 50 coupled between the gate resistor 52, which aids in increasing the temperature stability of the silicon controlled rectifier 48, and the voltage threshold sensing device 54, which similarly preferably comprises a diac. In addition, a resistor 78 is preferably connected across capacitor 40, as shown, for minimizing the affects of any variations in the output voltage generated by the power supply 12. The balance control 26 which again comprises a variable resistor is connected intermediate the serially connected primary windings 72a and 74a and also coupled to the junction between the resistor 42 and capacitor 40. In addition, a voltage limiting resistor 80 is also provided intermediate the primary windings 72a and 74a in order to aid in balancing the toroid cores during initial calibration.

The voltage sensing network 30 is similarly provided for detecting the presence of voltage output signals developed across the secondary windings 72b, 74b due to the passage of unequal currents through the adjacent sections 20, 22 of the conductors 16, 18. The voltage sensing network 30 includes the second selectively energizable switch means 62 preferably comprising a silicon controlled rectifier, as previously explained in connection with FIG. 2. If desired, the series connected resistor 64 and capacitor 66 may be provided coupled to the gate electrode of the silicon controlled rectifier 62 functioning as a filter network for preventing nuisance triggering due to temporary transients or spurious signals, although various other means are readily available for preventing nuisance triggering. In addition, a damping resistor 82 is connected across the serially connected secondary winding 72b, 74b in order to assure the provision of an output pulse of sufficient duration to effect firing of silicon controlled rectifier 62.

Conduction or energization of the silicon controlled rectifier 62 is similarly effective to effect operation of the circuit breaker means 14 as in connection with the FIG. 2 embodiment. In this regard, the anode of the silicon controlled rectifier 62 is coupled to the selectively energizable relay coil 32 through a current limiting resistor 84, while the selectively energizable relay coil is operatively connected to the relay contacts 68 and 70 which are opened in response to energization of the relay coil 32 to effect disruption of the power being supplied to the load 10.

Operation of the embodiment illustrated in FIG. 6 is essentially identical to that of the embodiment illustrated in FIG. 2 in that the energizing circuit 76 effects the application of an initial bias signal to the primary windings 72a and 74a of the toroid cores 72 and 74 so as to initially magnetically bias the cores in one magnetic direction. The energizing circuit similarly applies a high energy pulse (as indicated by the portion 58 of the voltage curve in FIG. 4) in order to abruptly drive the cores into saturation in the opposite magnetic direction. In the absence of a magnetic field due to the passage of unequal currents through the adjacent sections 20 and 22 the toroid cores 72 and 74 are driven into saturation is substantially the same time interval so that no output signal is developed across the sensing resistor 82 connected across the secondary windings 72b and 74b and the silicon controlled rectifier 62 remains nonconductive. However, in the presence of a leakage current to ground a magnetic field is established which affects the magnetization of the toroid cores such that each of the cores is driven into saturation in a different time interval resulting in the establishment of a voltage signal across the serially connected secondary windings 72b and 74b, as previously explained. This voltage signal is also developed across the sensing resistor 82 and is applied to the gate of the silicon controlled rectifier 62 to render the silicon controlled rectifier conductive, thereby energizing the relay coil 32 and effecting opening of the relay contacts 68 and 70 so as to disrupt the power being supplied to the load.

It should be noted that the above-described embodiments, although illustrating the provision of a safety system for protection in connection with AC signals are equally applicable for use in providing similar protection in connection with DC signals in which an inequality between a DC input and return signal due to the presence of leakage current could be similarly sensed by its affect on the magnetization of a similar saturable core magnetic means in the manner described in the preceding embodiments.

Accordingly, a unique electronic safety system has been described in which the presence of extremely minute potentially harmful ground leakage currents, ordinarily undetected by conventional protective equipment, are detected by an extremely sensitive system, adapted to effect disruption of the power being supplied to a load in the presence of such ground leakage currents.

Various changes and modifications in the above-described invention will be readily apparent to those skilled in the art ad any such changes or modifications are deemed to be within the spirit and scope of the appended claims.

1. An electronic safety system for detecting the presence of an electrical fault resulting in the leakage of electrical current from a load circuit to ground comprising means for coupling the load circuit to a power supply including a first and second electrical conductor, one of said electrical conductors being coupled to ground to define a path for leakage currents from the load circuit to ground, selectively energizable saturable core magnetic means coupled to the power supply, said saturable core magnetic means being inductively coupled to adjacent sections of said first and second electrical conductors intermediate the load circuit and the power supply, means for energizing said saturable core magnetic means in order to establish preselected magnetic fields, said preselected magnetic fields being substantially equal during the passage of essentially equal currents through said adjacent sections and being affected by the passage of unequal currents through said adjacent sections, means for producing an electrical signal in response to the affect on said magnetic fields, and means for sensing the presence of said electrical signal as an indication of current leakage to ground from the load circuit.

2. An electronic safety system in accordance with claim 1 wherein said saturable core magnetic means comprise first and second saturable core toroids electrically coupled to each other such that said preselected magnetic fields are of opposite polarity and essentially equal magnitude during the passage of substantially equal currents through the adjacent sections of said first and second conductors and such that magnetic fields of opposite polarity and unequal magnitude are established in response to energization by said energizing means during the passage of unequal currents through the adjacent sections of said first and second conductors.

3. An electronic safety system in accordance with claim 2 wherein said energizing means is adapted to establish an initial magnetic bias in said first and second saturable core toroids and to then supply an electrical pulse signal driving said first saturable core reactor into magnetic saturation in a first predetermined time interval and driving said second saturable core reactor into magnetic saturation in a second predetermined time interval, said first and second predetermined time intervals being essentially equal during the passage of substantially equal currents through the adjacent sections of said first and second conductors and being unequal during the passage of unequal currents through the adjacent sections of said first and second conductors so as to effect the production of an electrical signal having a magnitude related to the differential time interval.

4. An electronic safety system in accordance with claim 3 wherein the adjacent sections of said first and second conductors are twisted upon each other in order to minimize effects of spurious electrical signals.

5. An electronic safety system in accordance with claim 3 wherein said energizing circuit includes means for providing half-wave rectified AC electrical power, a storage capacitor coupled between said means for providing rectified AC power and said saturable core toroids, and a selectively triggerable switch means having a control electrode, said switch means being coupled to said capacitor for effecting relatively rapid discharge thereof in order to produce a relatively high energy pulse for energizing said first and second saturable core toroids.

6. An electronic safety system in accordance with claim 5 wherein said switch means comprises a silicon controlled rectifier, and a voltage threshold device is provided coupled between said capacitor and said control electrode for triggering said silicon controlled rectifier in response to the establishment of a preselected voltage level across said capacitor to define a discharge path for said capacitor through said silicon controlled rectifier in order to effect the production of said high energy pulses.

7. An electronic safety system in accordance with claim 5 wherein said sensing means comprises a selectively energizable switch circuit coupled across the output of said first and second saturable core toroids, said selectively energizable switch circuit being adapted to be rendered conductive in response to the presence of said electrical signal.

8. An electronic safety circuit in accordance with claim 7 wherein said switch circuit includes means for selectively filtering said electrical signal prior to the conduction of said switch circuit.

9. An electronic safety circuit in accordance with claim 8 wherein a selectively operable circuit breaker means is coupled to said switch circuit for selectively disrupting the supply of power to said first and second conductors in response to conduction of said switch circuit.

10. An electronic safety system for selectively disrupting the supply of power to a load circuit in response to the leakage of electrical current to ground comprising means for coupling the load circuit to s source of electrical power, said coupling means including a pair of electrical conductors, one of said conductors being coupleable to ground to define a path for leakage currents from the load to ground, first and second selectively energizable saturable core toroids electrically coupled to the source of power and inductively coupled to adjacent sections of said pair of electrical conductors intermediate the load and the source of power, energizing circuit means connected between the source of power and said saturable core toroids for selectively energizing said first saturable core toroid in a first predetermined time interval and said second saturable core toroid in a second predetermined time interval during the passage of unequal currents through said adjacent sections of said pair of electrical conductors, means for sensing a voltage output signal developed across said saturable core toroids in response to the presence of a difference between said first and said second predetermined time intervals as an indication of the flow of leakage current to ground, and selectively operable circuit breaker means coupled to said sensing means for disrupting the power being supplied to said load circuit in response to the presence of said voltage output signal.

11. An electronic safety system for selectively disrupting the supply of power to a load circuit in response to the leakage of electrical current to ground comprising means for coupling the load circuit to a source of electrical power, said coupling means including a pair of electrical conductors one of said conductors being coupleable to ground to define a path for leakage currents from the load to ground, first and second selectively energizable saturable core toroids electrically coupled to the source of power and inductively coupled to adjacent sections of said pair of electrical conductors intermediate the load and the source of power, an energizing circuit connected between the source of power and said first and second saturable core toroids for initially effecting magnetic biasing of each of said saturable core toroids in a first direction, said saturable core toroids being adapted to be initially differentially magnetically biased in response to the passage of unequal electrical currents through said adjacent sections of said pair of conductors and for subsequently effecting magnetic saturation of said first and second saturable core toroids in a second direction in first and second predetermined time intervals respectively, said first and second time intervals being unequal in response to initial differential magnetic biasing, whereby an electrical output signal is established across said saturable core toroids, means responsive to said electrical output signal coupled to said saturable core toroids for providing a trigger signal in response to said electrical output signal, and selectively operable circuit breaker means for interrupting the supply of power to the load in response to the provision of said trigger signal.

12. An electronic safety system in accordance with claim 11 wherein said first and second saturable core toroids each have a primary winding and a secondary winding, said primary windings being electrically coupled to said energizing circuit, said secondary windings being electrically connected to said means responsive to said electrical output signal, and said adjacent sections of said pair of conductors pass generally centrally through said toroids and are adapted to affect the magnetization thereof.

13. An electronic safety circuit in accordance with claim 11 wherein said energizing circuit includes a means for supplying rectified AC power, a voltage storage capacitor connected between said means for supplied rectified AC power and said primary windings of said toroids, means coupled to said capacitor to assure the storage of a preselected voltage thereacross, a selectively triggerable switch means having a control electrode, said switch means being coupled to said capacitor, and a voltage threshold sensing device coupled to said control electrode and to said capacitor to effect triggering of said switch means in response to the establishment of said preselected voltage level across said capacitor to define a discharge path for said capacitor through said switch means, whereby said toroids are initially magnetically biased in said first direction during nonconduction of said switch means and abruptly driven into magnetic saturation in said second direction in response to triggering of said switch means.

14. An electronic safety system in accordance with claim 13 wherein said switch means comprises a first silicon controlled rectifier, said means responsive to said electrical output signal comprises a second silicon controlled rectifier having its gate-cathode circuit coupled across said secondary windings, whereby the establishment of said electrical output signal across said secondary windings is effective to energize said second silicon controlled rectifier to provide said trigger signal, and said selectively operable circuit breaker means includes a selectively energizable relay coil adapted to be energized by said trigger signals and a pair of relay contacts operatively connected to said relay coil, said relay contacts being connected between the source of power and the load for disrupting the supply of power to the load in response to energization of said relay coil.